United States Patent [19]
Yamada et al.

[11] 3,725,459
[45] Apr. 3, 1973

[54] PROCESS FOR PURIFYING ADIPONITRILE

[75] Inventors: Keisho Yamada; Kenji Nishimura; Shinichi Furusaki; Tatsuo Toshimitsu; Yukio Inaba, all of Ube, Japan

[73] Assignee: Ube Industries, Ltd., Ube-shi, Yamaguchi-ken, Japan

[22] Filed: Aug. 4, 1970

[21] Appl. No.: 60,859

[52] U.S. Cl................260/465.8 R, 260/465.2
[51] Int. Cl.......................................C07c 121/26
[58] Field of Search..............260/465.8 R, 465.2

[56] References Cited

UNITED STATES PATENTS 3,206,497  9/1965  Oblad..........................260/465.2
2,305,103  12/1942  Osgood......................260/465.2 X

FOREIGN PATENTS OR APPLICATIONS 628,059  9/1961  Canada........................260/465.8
672,712  10/1963  Canada........................260/465.8

*Primary Examiner*—Joseph P. Brust
*Attorney*—Sherman and Shalloway

[57] ABSTRACT

A process for purifying crude adiponitrile which comprises contacting crude liquid adiponitrile with oxygen or a gas containing molecular oxygen at a temperature of from 120° to 300°C. to thereby convert impurities in the crude adiponitrile into colored high-boiling compounds, and separating adiponitrile from the colored, high-boiling compounds by distillation under reduced pressure.

5 Claims, 1 Drawing Figure

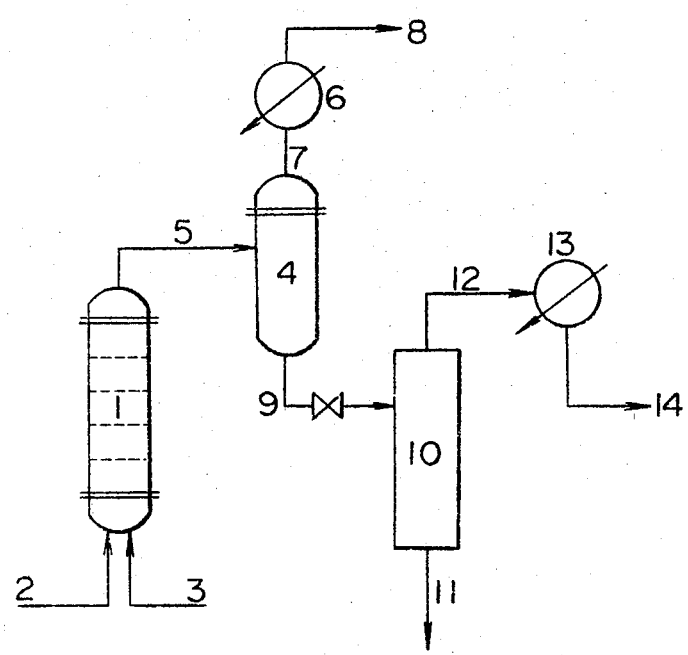

PROCESS FOR PURIFYING ADIPONITRILE

This invention relates to a purification process of adiponitrile. More particularly, the invention relates to a process for purifying crude adiponitrile containing such impurities as 1--imino-2-cyanocyclopentane, which comprises contacting the crude adiponitrile with molecular oxygen at high temperatures to change the impurities to high boiling point substances, and separating the substances by relatively simple distillation procedure.

Adiponitrile is a valuable starting material for the preparation of hexamethylenediamine, which is used in the preparation of polyamides such as nylon 66. Before it can satisfactorily be used in the preparation of hexamethylenediamine, however, adiponitrile must be thoroughly purified.

Industrially produced crude adiponitrile normally contains various impurities. Of these the chief impurity is 1-amino-2-cyanocyclo-pentane which is formed by the intra-molecular cyclization of adiponitrile. This impurity, which undergoes imino-enamine tautomerism in accordance with the equation:

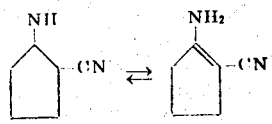

is extremely difficult to remove from crude adiponitrile by fractional distillation. Indeed to remove it in this way it is necessary to use large-scale, high-performance rectification columns with a large number of theoretical plates.

An attempt to purify the crude adiponitrile by crystallization is also known, but the procedure is cumbersome and expensive. As other methods, use of an adsorbing agent such as ion-exchange resin to remove the impurities has been proposed, but its effect for removing 1-imino-2-cyanocyclopentane (hereinafter briefly referred to as cyanoimine) is insufficient.

Therefore, heretofore it is practiced to add suitable chemicals to crude adiponitrile to convert cyanoimine to another easily separable compound, thereafter eliminating such compound.

Among the known processes using the treating chemicals as above, one of the particularly effective is the oxidation process using potassium permanganate (DAS 1,023,754; U.S. Pat. No. 2,305,103). However, potassium permanganate is rather costly, and furthermore formation of fine solid materials such as manganese dioxide is inevitable, removal of which is considerably cumbersome and incurs additional expenses. The process is still unsatisfactory in that the loss of adiponitrile adhered to the solid, or dissolved in aqueous phase, is inavoidable. Also other various solid or liquid reagents have been proposed as the treating chemicals, but in all cases filtration or separation in succession to the treatment is required, which not only is cumbersome, but also causes adhesion or dissolution loss.

The object of the present invention is to provide a refining process of impure adiponitrile with very simple treatment without using expensive chemicals, thereby producing refined adiponitrile at high recovery ratio.

We discovered that, upon gas-liquid contacting the crude adiponitrile with molecular oxygen or oxygen-containing gas at 120° – 300°C. for 10 minutes — 20 hours, the impurities such as cyanoimine are selectively converted to high boiling point impurities, which can be very easily separated by distillation. Also quite surprisingly, under such severe conditions the adiponitrile itself in the crude adiponitrile receives no substantial attack by the molecular oxygen or oxygen-containing gas, and high purity adiponitrile can be recovered at high yield.

These discoveries are indeed surprising, because it has been hitherto recognized that contacting of adiponitrile with molecular oxygen or air at high temperatures, particularly above 100 °C., causes formation of side-products, as, for example, described in DAS 1,023,754, col. 1, lines 41 – 46. In fact, when fully purified adiponitrile is contacted with molecular oxygen, for example, at 200 °C. for several hours, partial deterioration of the adiponitrile takes place, and impurities which cannot be easily separated by simple fractional distillation are formed. Therefore, it is entirely unpredictable that molecular oxygen or air could be used for purification of adipnitrile, since they have been regarded as injurious for that purpose.

In the treatment of crude adiponitrile containing cyanoimine and/or cyanoimine analogues as the impurities, such impurities are selectively attacked by molecular oxygen and converted to a heavy colored, high boiling point component which is separable by simple distillation, while oxidation of adiponitrile itself as (in the case of) refined adiponitrile is remarkably inhibited.

According to the present invention, a refining process of adiponitrile which comprises gas-liquid contacting crude and adiponitrile with molemular oxygen or oxygen-containing gas at temperatures ranging from 120° to 300°C., and thereafter recovering refined adiponitrile from the so treated system by reduced pressure distillation, is provided.

Such subject process is generally effective for purifying crude adiponitrile, and is particularly valuable for the purification of crude adiponitrile containing cyanoimine as the impurity.

Crude adiponitrile is obtained, for example, by passing adipic acid and ammonia over a dehydrating catalyst. The crude adiponitrile thus obtained contains relatively large amount of cyanoimine as the impurity, and therefore is particularly suitable as the material to be treated in accordance with the subject process. Such crude adiponitrile can be subjected to the described refining process either as it is, or after initial removal of low boiling point impurities and/or high boiling point impurities by fractional distillation and then processed as in this invention.

Cyanoimine can be detected by gas chromatography when present in relatively large amounts but the sensitivity of this method of detection is not sufficient for small amounts. Because of this the colorimetric analysis of Maslennikov (J. Appl. Chem. U.S.S.R. (1961), 2647) was employed in measuring the impurity levels described in this specification. With this method trace amounts, for example 1 or 2 ppm, of cyanoimine can be detected. It should be understood however, that although cyanoimine is the chief impurity which develops pink color with this analytical method, crude adiponitrile, especially the initial fraction of the distillate, usually contains other colorimetrically positive impurities, and such impurities are included in the analysis values given in this specification.

The cyanoimine content of crude adiponitrile can vary over a wide range, preferably it is from 100 ppm to 20,000 ppm (2 percent). Unless the cyanoimine content of the crude adiponitrile is extremely high, it can be reduced to the order of several to several tens of ppm in a single purification stage. When, however, the starting material is very impure and contains large amounts of cyanoimine or analogues thereof, the purification process may have to be repeated one or more times to reduce the concentration of impurities to the desired low level. This is because at high impurity levels the rate of conversion to the high-boiling impurities tends to fall off and reaction times are prolonged.

According to the present invention, above-described crude adiponitrile is contacted with molecular oxygen or oxygen-containing gas as a gas-liquid system. Through same treatment the impurities such as cyanoimine are converted to colored high boiling point impurities. Suitable treating temperatures range from 120° to 300 °C., particularly from 150° to 250 °C. At below 120 °C., the rate of reaction to convert the impurities to the high boiling point impurities is impractically low. At high temperatures above 300 °C., oxidation loss of adiponitrile is objectionably increased, and also isomerization of adiponitrile takes place, forming new cyanoimine. When no catalyst is employed, the optimum temperature ranges from 170° to 250 °C., and when later-described catalyst is used, it ranges from 150° to 230 °C.

Suitable treating time varies considerably, depending on the treating temperature and optional use of catalyst, but normally the gas-liquid contact is effected for the time sufficient for converting the impurities to colored high boiling point impurities, within the range of 10 minutes to 20 hours. The correlation between the treating time and temperature is such that, for example, approximately 10 hours at 180 °C., approximately 5 hours at 200 °C., and approximately 2 hours at 220 °C. It should be understood, however, that thoseconditions are further subject to considerable changes due to such other factors as partial pressure of oxygen in the gas, impurities content of the crude adiponitrile, and type of catalyst employed.

Besides molecular oxygen, an oxygen-containing gas diluted with nitrogen and other inert gases, such as air, can be used as the oxygen source. Atmospheric pressure can be satisfactorily employed, while it is permissible to use elevated pressures, e.g., up to the level at which the partial pressure of oxygen becomes approximately 20 kg/cm$^2$.

The treating operation of crude adiponitrile with oxygen is subject to no specific limitation, as long as the sufficient gas-liquid contact of the two is secured. The treatment may be performed either batchwise or continuously. For instance, molecular oxygen or air may be blown into the liquid, crude adiponitrile maintained at the specified temperature range, to cause sufficient contact of the two. Alternatively, liquid, crude adiponitrile and molecular oxygen or air may be together vigorously agitated under atmospheric or elevated pressure to bring about the required contact. Furthermore, the liquid film or droplets of crude adiponitrile may be gas-liquid contacted with molecular oxygen or oxygen-containing gas, using packed type, plate type, baffle type, or cavity type bubble tower.

One embodiment of the invention can be conveniently explained with reference to the drawing, in which 1 is the above-described gas-liquid contact apparatus, e.g., perforated plate column, which is maintained at the suitable reaction temperature. Crude adiponitrile which is pre-heated to the reaction temperature is continuously supplied into the bottom portion of gas-liquid contact column 1, through the pipe 2. Simultaneously, oxygen or air of atmospheric or elevated pressure is supplied into the column through pipe 3. The treated product is led to a gas-liquid separator 4 through pipe 5, and the exhaust gas is discharged from 8, via pipe 7 and the condensor 6. The reaction liquid is led to a reduced pressure evaporator 10 through pipe 9, and there separated from the colored high boiling point impurities. The purified adiponitrile is withdrawn from pipe 14, through pipe 12 and cooler 13. The colored high boiling point impurities are discharged from pipe 11. The adiponitrile distilled off from the pipe 14 is optionally led to a rectification column to be subjected to fractional distillation to produce adiponitrile of still higher purity. The initial fraction of distillate and a minor amount of high boiling point impurities separated at the rectification column are recycled to the gas-liquid contact column 1. It is also permissible to treat the distillate with a strongly basic ion-exchange resin or with a minor amount of alkali before passing it to the rectification column in order to eliminate therefrom any carboxylic acids which may be present.

Presence of catalyst in the contact system of crude adiponitrile liquid with molecular oxygen or oxygen-containing gas in accordance with the invention is optional. With the use of suitable catalyst, the treating time can be shortened, treating temperature lowered in a relative sence, and further the purifying effect can be improved, compared with the cases using no catalyst.

As the catalyst, oxides, inorganic acid salts, basic inorganic acid salts, organic acid salts, and chelate compounds, of transition metals, and mixtures of the foregoing, are conveniently used. As the transition metals, manganese, iron, copper, cobalt, nickel, and chromium are most preferred. Examples of the catalysts usable in this invention with particular advantage are as follows:

a. Oxides :
   Copper oxide (CuO)
b. Inorganic acid salts :
   Halides, such as bromides or iodides of manganese, iron, copper, cobalt, nickel and chromium;
   Nitrates, such as manganese nitrate, iron nitrate, and copper nitrate
c. Basic inorganic acid salts
   Basic carbonate, for example, basic copper carbonate
d. Organic acid salts
   Carboxylates of manganese, iron, copper, cobalt, nickel, and chromium; for example, acetate, propionate, butyrate, valerate, caproate, palmitate, stearate, succinate, glutarate, adipate, benzoate, octanate and naphthenate of named metals c. Chelate compounds β-diketone or β-keto-acid ester complex of manganese, iron, copper, cobalt, nickel and chromium; for example, acetylacetonate complex.

Besides the foregoing, ammonium metavanadate may be used as the catalyst.

The above catalysts are used in a catalytic quantity, for example, normally 0.005 to 2.0 percent by weight based on the weight of the crude adiponitrile. Use of the catalyst exceeding the above upper limit normally achieves no corresponding improvement in the purifying effectiveness of the process.

Upon the gas-liquid contact of crude adiponitrile with oxygen or oxygen-containing gas as above-described, the impurities such as cyanoimine are converted to black colored high boiling point impurities. According to the invention, the treated product containing the high boiling point impurities is subjected to reduced pressure distillation, and the refined adiponitrile is recovered. The reduced pressure distillation is preferably performed at 115° – 155 °C., at a reduced pressure of approximately 2 – 10 mm Hg.

As already mentioned, when the cyanoimine content of crude adiponitrile is relatively low, high purity adiponitrile containing no more than several to several tens of ppm of cyanoimine can be recovered by the single refining operation described above. When crude adiponitrile containing cyanoimine in the order of several percent is subjected to the purification of this invention, the rate of reaction to convert cyanoimine to high boiling point impurities is gradually decreased as the treating time is prolonged. In that case, the treated adiponitrile from which the high boiling point impurities have been removed may be again subjected to the refining procedure, thereby ultimately reducing the cyanoimine content of the adiponitrile to the level of several to several tens of ppm.

As has been described above, with such simple procedure as gas-liquid contact of crude adiponitrile with molecular oxygen or oxygen-containing gas in accordance with the invention, the impurities in the adiponitrile such as cyanoimine can be readily converted to high boiling point impurities and can be eliminated. To our surprise, furthermore, the conversion is not accompanied by deterioration of adiponitrile itself or objectionable side reaction. Thus, according to the invention it is possible to recover purified adiponitrile of which cyanoimine content is reduced to the order of several tens to only several ppm, at high recovery ratio such as 95 percent to even 99 percent.

Hereinafter the invention will be explained with reference to the working examples.

EXAMPLE 1

Crude adiponitrile of 97.8 percent purity, containing 2,300 ppm (measured by colorimetric method) of cyanoimine was obtained by reduced pressure distillation of black oil layer formed upon passing adipic acid and ammonia on a dehydrating catalyst at high temperatures. The crude adiponitrile was pale greenish yellow immediately after the distillation, but presently changed to dark, reddish brown when allowed to stand.

One hundred g of the crude adiponitrile were placed in a flask of 300 ml in capacity, and heated to 200 °C. under agitation in a nitrogen current. Then while the crude adiponitrile was maintained at such temperature, oxygen gas was introduced thereinto through capillary tubes at a flow rate of 200 ml per minute. The liquid turned black, and very minor amount of carbon-like matter was formed. Then the reaction liquid was subjected to reduced pressure distillation at 120°C. and 3 mmHg, causing the separation of substantially colorless, purified adiponitrile from colored high boiling point impurities. The yield of purified adiponitrile was 94 g (corresponding to 96 percent recovery) The product's cyanoimine content was 58 ppm after hours 2 oxygen supply, and 11 ppm after hours 5 supply. The purified adiponitrile developed no color during prolonged storage (longer than one month).

EXAMPLE 2

The same treatment as described in Example 1 was repeated except that the oxygen gas was replaced by air. The reaction was performed at 200°C. for 5 hours, and the resulting black reaction liquid was distilled under reduced pressure. Substantially colorless, purified adiponitrile was obtained with the recovery ratio of 92 percent. The cyanoimine content of the purified adiponitrile was 32 ppm.

EXAMPLES 3 – 5

The same crude adiponitrile as employed in Example 1 was similarly treated, except the temperature and oxygen supply time were varied in each run. The reaction liquid was distilled under reduced pressure in all runs, with the results as given in Table 1.

TABLE 1

| Example No. | Temp. (°C.) | Time (hr.) | Recovery ratio (%) | Cyanoimine content (ppm) |
|---|---|---|---|---|
| 3 | 180 | 10 | 94 | 8 |
| 4 | 220 | 2.5 | 94 | 13 |
| 5 | 250 | 1.0 | 92 | 17 |

EXAMPLE 6

To 500 g of crude adiponitrile of 98.0 percent purity containing 3,500 ppm of cyanoimine which was obtained in the similar manner to Example 1, 2.5 g of manganese acetate (tetrahydrate, $Mn(CH_3—COO)_2 \cdot 4H_2O$) (0.5 wt. percent) were added, and the system was heated to 180 °C. in a nitrogen current under stirring. Then 250 ml/min. of oxygen gas was blown into the system through a sintered glass gas-dispersing plate. The reaction was continued for 5 hours. The exhaust gas was passed through a reflux condenser in order to recycle the condensate to the reactor. Thus 503 g of black reaction liquid were obtained, which was transferred into a Claisen type distillation flask and distilled under a reduced pressure of 5 mm Hg. Thus 1 g of condensed water, 485 g of purified adiponitrile (recovery ratio : 99 percent), and 14g of black residue were obtained. The cyanoimine content of purified adiponitrile was 9.9 ppm. The product developed no color during a long period of standing.

EXAMPLE 7

To 500 g of the same crude adiponitrile employed in Example 6, 0.5 wt. percent of manganese acetate was added, and oxygen gas was blown into the system similarly to Example 6 for 3 hours at 200°C. From the resulting 503 g of black reaction liquid, 18 g of residue were separated by reduced pressure distillation. Thus 482 g of substantially colorless, purified adiponitrile (recovery ratio : 98.3 percent) were obtained, of which the cyanoimine was 6.4 ppm. Upon further rectification of the adiponitrile, cutting 5 percent of initial fraction, the cyanoimine content was reduced to 2 – 3 ppm. The initial fraction of distillate could be recycled to the oxidation step to be repetitively treated.

EXAMPLES 8 – 11

To 100 g each of crude adiponitriles of different cyanoimine contents, 0.5 wt. percent of manganese acetate was added, and oxygen gas was blown into each system similarly to Example 1 at 200°C. The black reaction liquids obtained were distilled under reduced pressure, and high boiling components were removed. Cyanoimine contents of the purified adiponitrile (recovery ratio : 94 – 96 percent) were as given in Table 2 below.

TABLE 2

| Example No. | Cyanoimine content of starting crude adiponitrile (ppm) | Oxygen supply temp. (°C.) | Oxygen supply time (hr.) | Cyanoimine content of purified adiponitrile (ppm) |
|---|---|---|---|---|
| 8 | 18,600 | 200 | 6 | 27 |
| 9 | 10,800 | 200 | 6 | 19 |
| 10 | 7,600 | 200 | 3 | 19 |
| 11 | 118 | 200 | 3 | 4.9 |

EXAMPLES 12 – 14

One-hundred g each of crude adiponitrile containing 2,700 ppm of cyanoimine were heated to a predetermined temperature in a nitrogen current under stirring. Thereafter 1 wt. percent of cupric acetate (monohydrate, $Cu(CH_3COO)_2 \cdot H_2O$) was added to each system, followed by introduction of oxygen at a rate of 200 ml/min. After each predetermined reaction time, the resulting black reaction liquid was distilled under reduced pressure. The cyanoimine contents of the main fractions of distillate (recovery ratio : 92 – 95 percent) were as given in Table 3 below.

TABLE 3

| Example No. | Oxygen supply temp. (°C.) | Oxygen supply time (hr.) | Cyanoimine content of purified adiponitrile (ppm) |
|---|---|---|---|
| 12 | 160 | 3 | 9.4 |
| 13 | 160 | 5 | 6.4 |
| 14 | 180 | 3 | 4.1 |

The effectiveness of the catalyst was thus clearly demonstrated, in comparison with Example 3.

EXAMPLE 15

One-hundred g of crude adiponitrile containing 7,700 ppm of cyanoimine was heated to 170 °C. in nitrogen current under stirring. Then 1 wt. percent of copper oxide (CuO) or copper (II) basic carbonate $(Cu(OH)_2 \cdot CuCO_3)$ was added as the catalyst. At the specified temperature oxygen gas was introduced into the liquid system for 3 hours at a flow rate of 200 ml/min. The black reaction liquid was distilled under reduced pressure to be separated from the waste, and purified adiponitrile containing 16 ppm of cyanoimine were obtained at a recovery ratio of 93 – 94 percent.

EXAMPLE 16

To 100 g of crude adiponitrile containing 1,750 ppm of cyanoimine, 1 wt. percent of cobalt bromide $(CoBr_2 \cdot 6H_2O)$ or manganese nitrate $(Mn(NO_3)_2 \cdot 6H_2O)$ was added as the catalyst. Oxygen gas was introduced into the liquid system at 180 °C. for 5 hours under stirring. The resulting reaction liquid was distilled under reduced pressure to be separated from the black waste. Thus substantially colorless, purified adiponitrile was obtained at a recovery ratio of 92 – 95 percent. The cyanoimine content of purified adiponitrile was, 5.9 ppm when cobalt bromide catalyst was used, and 2.3 ppm when manganese nitrile catalyst was used. When no catalyst was used, the cyanoimine content was 21.0 ppm.

EXAMPLES 17 – 26

To 100 g each of crude adiponitrile containing 4,800 ppm of cyanoimine, 1 g each of various catalysts shown in Table 4 was added. Into each system oxygen gas was introduced at a rate of 200 ml/min., at 180 °C. for 5 hours, similarly to Example 16. The resulting black reaction liquid was distilled under reduced pressure. The cyanoimine contents of the main fractions of distillate (recovery ratio : 92 – 95 percent) were as given in Table 4.

TABLE 4

| Example No. | Catalyst Type | Quantity (wt.%) | Cyanoimine content of purified adiponitrile (ppm) |
|---|---|---|---|
| 17 | Mn-Naphthenate | 1 | 4.2 |
| 18 | Mn-Acetylacetonate | 1 | 3.1 |
| 19 | $Fe^{II}$-Acetate | 1 | 6.1 |
| 20 | Co-Acetate $4H_2O$ | 1 | 16.7 |
| 21 | $Ni^{II}$-Acetate $H_2O$ | 1 | 10.8 |
| 22 | Cr-Acetate $H_2O$ | 1 | 13.0 |
| 23 | Mn-Acetate $4H_2O$ | 0.5 | 6.3 |
|  | $Fe^{II}$-Acetate | 0.5 |  |
| 24 | Mn-Acetate $4H_2O$ | 0.5 | 2.6 |
|  | $Cu^{II}$-Acetate $H_2O$ | 0.5 |  |
| 25 | Mn-Acetate $4H_2O$ | 0.5 | 4.5 |
|  | Co-Acetate $4H_2O$ | 0.5 |  |
| 26 | $NH_4VO_3$ | 1 | 6.4 |
| Control | None |  | 21.8 |

EXAMPLE 27

Crude adiponitrile containing approximately 8,000 ppm of cyanoimine was charged into an outoclave, which was filled with 20 kg/cm²G of oxygen gas. The autoclave content was stirred for an hour at an elevated temperature of 200 °C., and then allowed to cool off to the ambient temperature. Relieving the pressure, the black reaction liquid was withdrawn, which was distilled under reduced pressure. Thus 120 °C./3 mm Hg of main fraction of distillate was obtained, of which the cyanoimine content was 7.6 ppm, and recovery ratio of adiponitrile was 88.3 percent. The initial fraction of distillate was combined with the distillation waste, and again oxidized under identical conditions, followed by similar distillation. Additional purified adiponitrile containing 15 – 17 ppm of cyanoimine was obtained, rendering the total recovery ratio 97 percent.

EXAMPLE 28

Example 27 was repeated except that the pressurized oxygen was replaced by 100 kg/cm²G of air. The main fraction of distillate containing 9.5 ppm of cyanoimine was obtained at a recovery ratio of 87.2 percent.

EXAMPLE 29

Into an autoclave of 106 mm in inner diameter and 2.8 m in height provided with perforated plate accommodated therein, a pre-heated mixture of crude adiponitrile (purity: 98.7 percent) containing 2,400 ppm of cyanoimine and 0.1 wt. percent of manganese acetate was introduced from the bottom at a flow rate of 40 liters/hr., to be contacted with pressurized oxygen of 20 kg/cm²G at 200° ± 5 °C. The reaction product was continuously withdrawn from the top at approximately the same rate. The gas-liquid contact time was 0.5 hours. 1,500 Parts of the reaction product was distilled under reduced pressure, thereby providing 1,472 parts of purified adiponitrile and 22 parts of black waste. The purified adiponitrile contained 11 ppm of cyanoimine, which did not develop color over prolonged period of storage.

CONTROL

To 200 g of crude adiponitrile (purity : 98.7 percent) containing 1,800 ppm of cyanoimine, 0.5 wt. percent of manganese acetate was added. Into that liquid system, oxygen gas was introduced at 200 °C. for 5 hours under stirring, at a flow rate of 200 ml/min. Some 201 g of black reaction liquid was distilled under reduced pressure, thereby separating 8 g of black waste. The distillate was further rectified with a 18-cm long Vigreux fractionating column, and 180 g of substantially colorless, purified adiponitrile was obtained as the main fraction of distillate, cutting 5 percent of initial fraction of distillate. The product's cyanoimine content was 2.0 ppm, and $KMnO_4$ consumption (cf. U.S.Pat. No. 2,920,099, col. 2, lines 23 – 32) was 0.10.

In comparison, 3 wt. percent of solid, finely divided $KMnO_4$ was added to 200 g of same starting material as above, followed by stirring at 40 °C. until the violet color of $KMnO_4$ disappeared after 2.5 hours. Thus formed $MnO_2$ was suction-filtered with a G–3 glass filter of 80 mm in diameter. The filtration required 20 minutes, and still 34 g of adiponitrile was lost as adhered to the filter cake. The filtrate (160 g) was fractionated with a 18-cm long Vigreux fractionating column, thus eliminating 10 percent of initial fraction of distillate and a minor amount of waste. The cyanoimine content of the main fraction of distillate was 7.1 ppm, and $KMnO_4$ consumption was 0.10. When the quantity of $KMnO_4$ used is reduced to 1.5 percent to the starting adiponitrile, the purified adiponitrile contained 56 ppm of cyanoimine, and $KMnO_4$ consumption was 0.20.

What we claim is:

1. A process for purifying crude adiponitrile which comprises treating crude liquid adiponitrile obtained by passing adipic acid and ammonia over a dehydrating catalyst, said crude liquid adiponitrile containing cyanoimines in an amount of about 100 ppm to about 20,000 ppm as impurities at a temperature of from 150° to 250°C., while blowing into said crude liquid adiponitrile molecular oxygen, or molecular oxygen diluted with an inert gas, for a time of from 10 minutes to 20 hours, to thereby reduce the content of said cyanoimines and recovering purified adiponitrile by reduced pressure distillation.

2. The process of claim 1 wherein the distillation is carried out at a temperature of 115° to 155°C., under a pressure of 2 to 10 mm Hg.

3. A process for purifying crude adiponitrile which comprises treating crude liquid adiponitrile obtained by passing adipic acid and ammonia over a dehydrating catalyst, said crude liquid adiponitrile containing cyanoimines in an amount of about 100 ppm to about 20,000 ppm as impurities, at a temperature of from 150° to 250°C., while blowing into said crude liquid adiponitrile molecular oxygen, or molecular oxygen diluted with an inert gas, for a time of from 10 minutes to 20 hours, in the presence of a catalyst selected from an acetate, naphthenate or acetylacetonate of manganese, iron, copper, cobalt, nickel or chromium; nitrate of manganese, oxide of copper; basic carbonate of copper; cobalt bromide and ammonium metavanadate in an amount of 0.005 to 2.0 percent by weight based on the weight of said crude adiponitrile, to thereby reduce the content of said cyanoimines and recovering purified adiponitrile by reduced pressure distillation.

4. The process of claim 3 wherein said catalyst is an acetate or naphthenate of a metal selected from the group consisting of manganese, iron, copper, cobalt, nickel and chromium.

5. The process of claim 3 wherein said catalyst is an acetylacetonate complex of a metal selected from the group consisting of manganese, iron, copper, cobalt, nickel and chromium.

* * * * *

UNITED STATES PATENT OFFICE
CERTIFICATE OF CORRECTION

Patent No. 3,725,459          Dated April 3, 1973

Inventor(s) Yamada, Keisho; Nishimura, Kenji; Furusakai, Shinichi; and Ube Industries Ltd.

It is certified that error appears in the above-identified patent and that said Letters Patent are hereby corrected as shown below:

Applicants hereby claim priority of:

Japanese Patent Application No. 62333/69,
        filed August 8, 1969, and

Japanese Patent Application No. 3884/70,
        filed January 16, 1970.

Signed and Sealed this second Day of March 1976

[SEAL]

*Attest:*

RUTH C. MASON
*Attesting Officer*

C. MARSHALL DANN
*Commissioner of Patents and Trademarks*